(12) United States Patent
Takahashi et al.

(10) Patent No.: US 7,708,637 B2
(45) Date of Patent: May 4, 2010

(54) GAME PROGRAM AND GAME APPARATUS

(75) Inventors: Hajime Takahashi, Kyoto (JP);
Gentaro Takaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 547 days.

(21) Appl. No.: 11/454,838

(22) Filed: Jun. 19, 2006

(65) Prior Publication Data

US 2007/0117636 A1    May 24, 2007

(30) Foreign Application Priority Data

Nov. 18, 2005    (JP)    ............... 2005-335027

(51) Int. Cl.
*A63F 13/00* (2006.01)
(52) U.S. Cl. ............................ 463/23; 463/1
(58) Field of Classification Search ............. 463/1, 463/2, 3, 4, 6, 23; 706/45, 46, 47
See application file for complete search history.

(56) References Cited

U.S. PATENT DOCUMENTS 6,024,643 A * 2/2000 Begis ..................... 463/42

FOREIGN PATENT DOCUMENTS

JP    2001-46734    2/2001

\* cited by examiner

*Primary Examiner*—Dmitry Suhol
*Assistant Examiner*—Thomas H Henry
(74) *Attorney, Agent, or Firm*—Nixon & Vanderhye P.C.

(57) ABSTRACT

Each time a player character performs a boom triggering act, "1" is added to the corresponding act number counter provided for each non-player character. The value of each act number counter is periodically added to a boom value provided for each non-player character. When a boom value reaches an upper limit, the corresponding non-player character performs an act related to the boom triggering act performed by the player character. Thus, the act of each non-player character is changed in accordance with the act performed by the player character in the game world, which provides the player with a fresh feeling that the act performed by the player character set a trend in the game world.

17 Claims, 15 Drawing Sheets

FIG. 8

| NPC1 (CURRENT BOOM: FLOWER) | | | | | | | | |
|---|---|---|---|---|---|---|---|---|
| BOOM | FISH | BUG | FOSSIL | CLOTHES | FURNITURE | FLOWER | SEA | NON-HOBBY |
| ACT NUMBER COUNTER | 6 | 0 | 1 | 0 | 3 | 3 | 1 | 4 |
| BOOM VALUE | 175 | 54 | 25 | 15 | 180 | 25 | 35 | 95 |

| NPC2 (CURRENT BOOM: NON-HOBBY) | | | | | | | | |
|---|---|---|---|---|---|---|---|---|
| BOOM | FISH | BUG | FOSSIL | CLOTHES | FURNITURE | FLOWER | SEA | NON-HOBBY |
| ACT NUMBER COUNTER | 6 | 0 | 1 | 0 | 3 | 3 | 1 | 4 |
| BOOM VALUE | 251 | 52 | 16 | 89 | 163 | 201 | 70 | 80 |

| NPC3 (CURRENT BOOM: FOSSIL) | | | | | | | | |
|---|---|---|---|---|---|---|---|---|
| BOOM | FISH | BUG | FOSSIL | CLOTHES | FURNITURE | FLOWER | SEA | NON-HOBBY |
| ACT NUMBER COUNTER | 2 | 0 | 1 | 0 | 1 | 0 | 1 | 1 |
| BOOM VALUE | 102 | 28 | 30 | 58 | 126 | 35 | 52 | 24 |

BOOM CORRECTION COEFFICIENT TABLE 49

| FISH | BUG | FOSSIL | CLOTHES | FURNITURE | FLOWER | SEA | NON-HOBBY |
|---|---|---|---|---|---|---|---|
| 3 | 3 | 5 | 5 | 3 | 3 | 2 | 1 |

FIG. 10

NPC CORRECTION COEFFICIENT TABLE 50

NPC1

| FISH | BUG | FOSSIL | CLOTHES | FURNITURE | FLOWER | SEA | NON-HOBBY |
|---|---|---|---|---|---|---|---|
| 0.25 | 1.1 | 0.5 | 1.1 | 1.1 | 0.25 | 0.4 | 1.1 |

NPC2

| FISH | BUG | FOSSIL | CLOTHES | FURNITURE | FLOWER | SEA | NON-HOBBY |
|---|---|---|---|---|---|---|---|
| 1.1 | 0.4 | 0.25 | 0.5 | 1.1 | 1.1 | 0.35 | 1.1 |

NPC3

| FISH | BUG | FOSSIL | CLOTHES | FURNITURE | FLOWER | SEA | NON-HOBBY |
|---|---|---|---|---|---|---|---|
| 0.35 | 0.25 | 1.1 | 1.1 | 3 | 1.1 | 1.1 | 0.5 |

⋮

GAME PROGRAM AND GAME APPARATUS

CROSS REFERENCE TO RELATED APPLICATION

The disclosure of Japanese Patent Application No. 2005-335027 is incorporated herein by reference.

BACKGROUND OF THE INVENTION

1. Field of the Invention

The present invention relates to a game program and a game apparatus, and in particular to a game program and a game apparatus for providing a video game in which, for example, a player character operable by a player and a plurality of non-player characters operable by a computer appear.

2. Description of the Background Art

Conventionally, there are video games in which a parameter of a non-player character (NPC) is changeable based on an input operation performed by a player (for example, patent document 1: Japanese Laid-Open Patent Publication No 2001-46734).

Patent document 1 discloses a technology for changing a parameter representing a personality of a player character in accordance with an input operation performed by the player, and also changing a parameter representing a personality of a non-player character in accordance with the parameter representing the personality of the player character. This technology simulates, in the game world, an event that a person's personality influences the personality of another person mingling with that person as in the real world.

In patent document 1, the personality of only one non-player character can be changed at a time in accordance with a change in the personality of the player character. However, in the real world, people do not always influence one to one. One person may influence a plurality of people at the same time, and how much these people are influenced depends on each individual. How the people are influenced also depends on whether each individual is close to or far from the influencing person.

SUMMARY OF THE INVENTION

Therefore, the present invention may be embodied to allow a player character's act to change the act of a non-player character in a game world and thus to provide the player with a fresh feeling.

The reference numerals, figure numbers and additional explanations in parentheses in this section of the specification indicate the correspondence with the embodiment described later for easier understanding of the present invention, and do not limit the present invention in any way.

A first aspect of the embodiments disclosed herein of the present invention is directed to a computer-readable storage medium having stored thereon a game program (40) for displaying, on a display device (11, 12), a game world (FIG. 3) including a player character (PC1) acting in accordance with operation information which is output from an input device (14, 15) by an input operation of a player and a plurality of non-player characters (NPC1, NPC2, NPC3) acting in a self-active manner. The game program causes the computer to function as player character control means (S20) for controlling an act of the player character in accordance with the operation information which is output from the input device; act number counter update means (S98, S100) for, when the player character performs each of a plurality of acts (boom triggering acts) which are respectively associated with a plurality of act tendencies influencing an act of each non-player character performed in a self-active manner, updating an act number counter (43) for the act tendency corresponding to the act of the player character among act number counters respectively provided for the act tendencies of each non-player character; act tendency value update means (S56) for updating an act tendency value (boom value 44), obtained by numerizing each act tendency of each non-player character, based on the value of the corresponding act number counter, the updating being performed at a predetermined timing without depending on the act of the player character; non-player character motion control means (S78) for controlling a motion of each non-player character based on the act tendency (current boom 46) corresponding to the act tendency value; and display means for displaying the game world including the player character and the plurality of non-player characters on the display device.

In a variation, the act number counter update means may update each act number counter of each non-player character with a different value in accordance with whether or not the non-player character exists in the game world.

In another variation, the act number counter update means may update each act number counter of each non-player character with a different value in accordance with the position of the non-player character in the game world.

In still another variation, the act number counter update means may update each act number counter of each non-player character with a different value in accordance with whether or not the non-player character is displayed on a screen of the display device.

In still another variation, the act number counter update means may update each act number counter of each non-player character with a different value in accordance with the positional relationship between the player character and the non-player character.

In still another variation, when the value of any act number counter has reached a predetermined upper limit, the act number counter update means may not update the act number counter.

In still another variation, until a certain duration of time passes after each act tendency value of each non-player character is changed by the act tendency value update means, the act number counter update means may not update the corresponding act number counter of the non-player character.

In still another variation, the act number counter update means may update each act number counter each time the player character performs one of the plurality of acts respectively associated with the plurality of act tendencies; and the act tendency value update means may update each act tendency value at a predetermined timing, which is not each time the player character performs one of the plurality of acts respectively associated with the plurality of act tendencies.

In still another variation, the act tendency value update means may update each act tendency value when the player starts or resumes the game.

In still another variation, the act tendency value update means may update each act tendency value at a certain time daily.

In still another variation, the act tendency value update means may update each act tendency value when a scene change has occurred in a game image displayed on the display device.

In still another variation, the act tendency value update means may update each act tendency value using a value obtained by multiplying a value of the corresponding act number counter by a correction coefficient predetermined for each act tendency.

In still another variation, the act tendency value update means may update each act tendency value using a value obtained by multiplying a value of the corresponding act number counter by a correction coefficient predetermined for each non-player character.

In still another variation, when there is an act tendency value which has reached a predetermined upper limit after the act tendency value update means updates each act tendency value of each non-player character, the act tendency of the non-player character may be changed into the act tendency corresponding to the act tendency value which has reached the upper limit and may reset the act tendency value which has reached the upper limit.

In still another variation, when the act tendency value which has reached the upper limit is reset, the remaining act tendency values may be updated to be reduced.

A second aspect of the disclosed embodiments of the present invention is directed to a game apparatus (10) for displaying, on a display device (11, 12), a game world (FIG. 3) including a player character (PC1) acting in accordance with operation information which is output from an input device (14, 15) by an input operation of a player and a plurality of non-player characters (NPC1, NPC2, NPC3) acting in a self-active manner. The game program comprises player character control means (21, S20) for controlling an act of the player character in accordance with the operation information which is output from the input device; act number counter update means (21, S98, S100) for, when the player character performs each of a plurality of acts (boom triggering acts) which are respectively associated with a plurality of act tendencies influencing an act of each non-player character performed in a self-active manner, for updating an act number counter (21, 43) for the act tendency corresponding to the act of the player character among act number counters respectively provided for the act tendencies of each non-player character; act tendency value update means (21, S56) for updating an act tendency value (boom value 44), obtained by numerizing each act tendency of each non-player character, based on the value of the corresponding act number counter, the updating being performed at a predetermined timing without depending on the act of the player character; non-player character motion control means (21, S78) for controlling a motion of each non-player character based on the act tendency (current boom 46) corresponding to the act tendency value; and display means for displaying the game world including the player character and the plurality of non-player characters on the display device.

The present invention may be embodied such that, an act of each non-player character is changed in accordance with the act performed by the player character in the game world. This provides the player with a fresh feeling that the act of the player character set a trend in the game world. Since the act tendency values are not updated in real time, the situation can be avoided that the act of the player character immediately influences the act of the non-player characters and the player finds it unnatural. According to preferable variations of the present invention, the degree of the influence exerted by the act of the player character on each non-player character varies in accordance with the positional relationship between the player character and the non-player character or the personality of the non-player character. Thus, the manner in which the act of the player character influences the non-player characters is closer to that of the human relationship in the real world. This makes the game more realistic and the player feels closer to the non-player characters.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows one specific example of an act number counter and a boom value;

FIG. 9 shows one specific example of a boom correction coefficient table;

FIG. 10 shows one specific example of an NPC correction coefficient table;

DESCRIPTION OF THE PREFERRED EMBODIMENTS

A structure and an operation of a game apparatus according to one embodiment of the present invention will be described, hereinafter.

Figure 1:
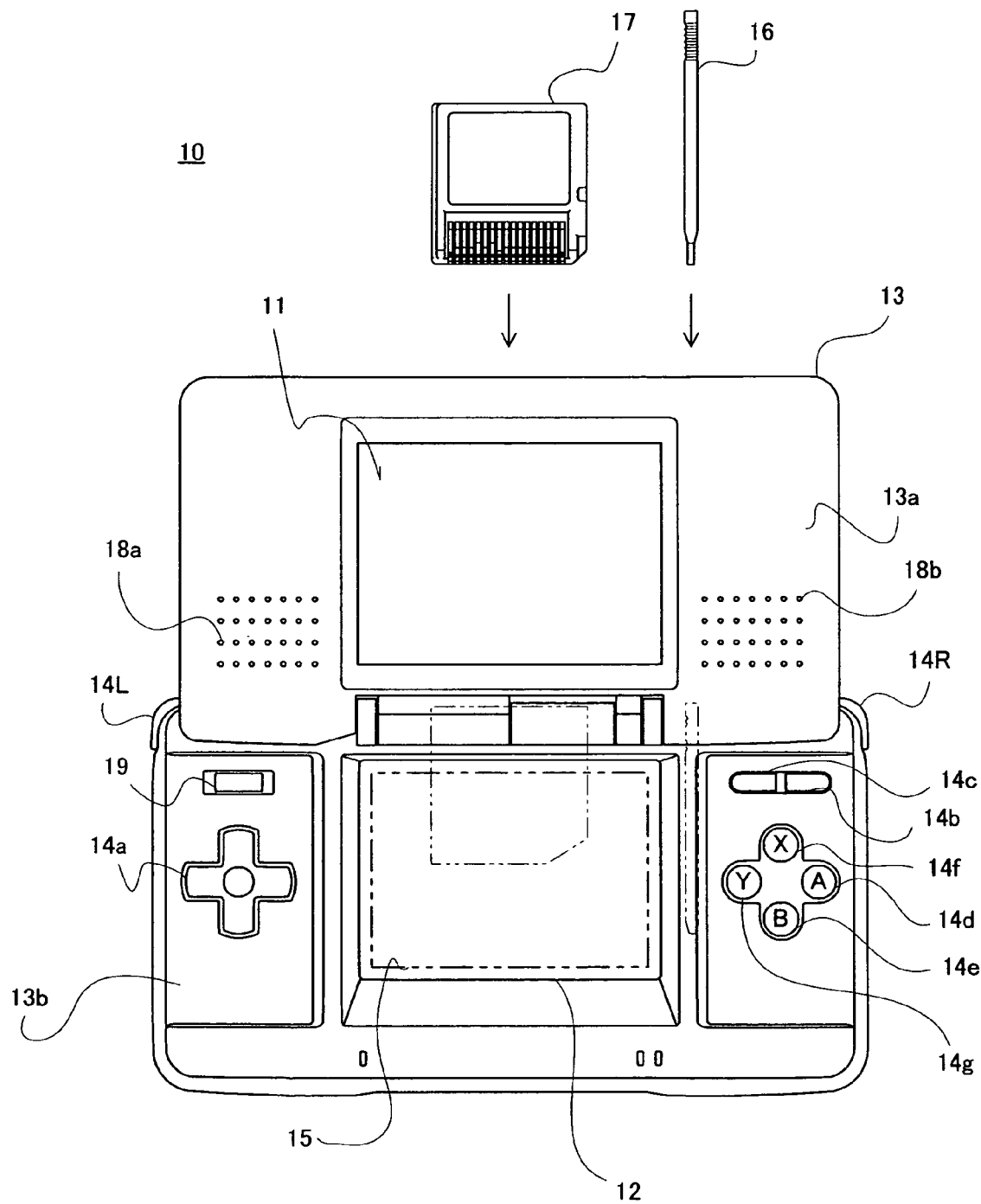
FIG. 1 is an external view of a game apparatus according to one embodiment of the present invention.

FIG. 1 is an external view of a game apparatus according to one embodiment of the present invention. As shown in FIG. 1, a game apparatus 10 includes a first LCD (Liquid Crystal Display) 11 and a second LCD 12. A housing 13 includes an upper housing 13a and a lower housing 13b. The first LCD 11 is accommodated in the upper housing 13a, and the second LCD 12 is accommodated in the lower housing 13b. The first LCD 11 and the second LCD 12 both have a resolution of 256 dots×192 dots. In this embodiment, LCDs are used as display devices, but alternatively, other arbitrary display devices such as EL (Electro Luminescence) devices or the like are usable. The display devices may have any resolution.

The upper housing 13a has speaker holes 18a and 18b for releasing a sound from a pair of speakers (represented with reference numerals 30a and 30b in FIG. 2) described later.

The lower housing 13b has a cross-shaped switch 14a, a start switch 14b, a select switch 14c, an A button 14d, a B button 14e, an X button 14f, a Y button 14g, an L button 14L and an R button 14R provided thereon as input elements. A touch panel 15 is attached to a screen of the second LCD 12 as an additional input element. The lower housing 13b has a power switch 19 and insertion holes for accommodating a memory card 17 and a stick 16.

The touch panel 15 may be of any system; for example, a resistance film system, an optical (infrared) system, or a static capacitance coupling system. The touch panel 15 has a function of, when a surface thereof is touched with the stick 16, outputting coordinate set data corresponding to the position of the surface touched by the stick 16. Hereinafter, the player operates the touch panel 15 using the stick 16. Alternatively, the player may operate the touch panel 15 using a pen (stylus pen) or his/her finger instead of the stick 16. In this embodiment, the touch panel 15 has a resolution of 256 dots×192 dots (detection precision) like the second LCD 12. It is not absolutely necessary that the touch panel 15 has the same resolution as that of the second LCD 12.

The memory card 17 is a storage medium having a game program stored thereon, and is detachably attachable into the insertion hole of the lower housing 13b.

Next, with reference to FIG. 2, an internal structure of the game apparatus 10 will be described.

Figure 2:
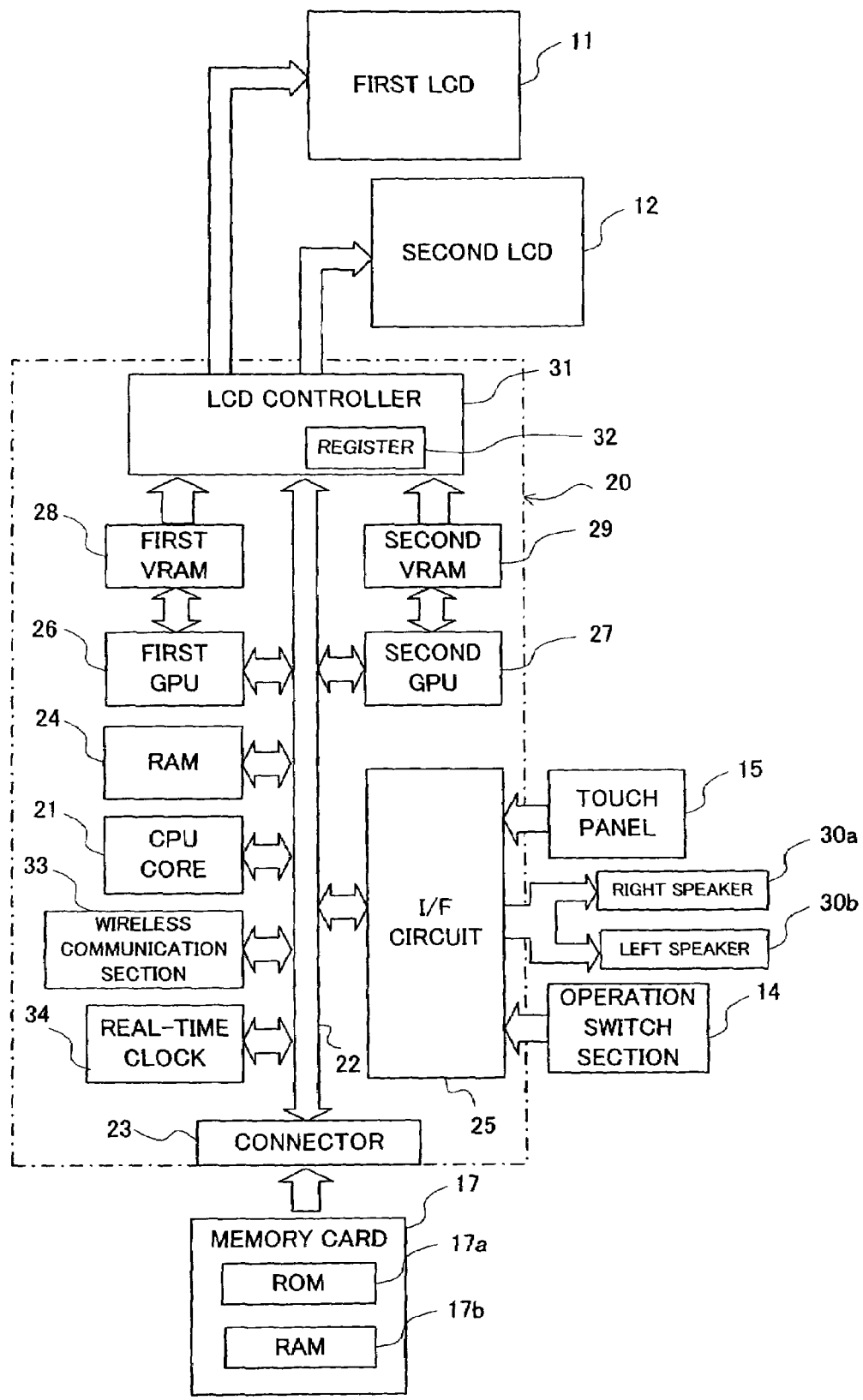
FIG. 2 is a block diagram showing an internal structure of the game apparatus.

As shown in FIG. 2, a CPU core 21 is mounted on an electronic circuit board 20 accommodated in the housing 13. The CPU core 21 is connected to a connector 23 and is also connected to an input/output interface circuit (represented as "I/F circuit" in FIG. 2) 25, a first GPU (Graphics Processing Unit) 26, a second GPU 27, a RAM 24, an LCD controller 31, a wireless communication section 33, and a real-time clock 34, via a bus 22. The memory card 17 is detachably connected to the connector 23. The memory card 17 includes a ROM 17a having a game program stored thereon and a RAM 17b having backup data rewritably stored thereon. The game program stored on the ROM 17a of the memory card 17 is loaded onto the RAM 24, and the game program loaded onto the RAM 24 is executed by the CPU core 21. The RAM 24 stores temporary data obtained by the execution of the game program by the CPU core 21 and data for generating game images, as well as the game program. The I/F circuit 25 is connected to the touch panel 15, a right speaker 30a, a left speaker 30b, and an operation switch section 14 including the cross switch 14a, the A button 14d and the like shown in FIG. 1. The right speaker 30a and the left speaker 30b are respectively located inside the speaker holes 18a and 18b.

The first GPU 26 is connected to a first VRAM (Video RAM) 28, and the second GPU 27 is connected to a second VRAM 29. In response to an instruction from the CPU core 21, the first GPU 26 generates a first game image based on the data stored on the RAM 24 for generating game images, and draws the first game image in the first VRAM 28. Similarly, in response to an instruction from the CPU core 21, the second GPU 27 generates a second game image and draws the second game image in the second VRAM 29. The first VRAM 28 and the second VRAM 29 are connected to the LCD controller 31.

The LCD controller 31 includes a register 32. The register 32 stores the value of "0" or "1" in accordance with an instruction from the CPU core 21. When the value in the register 32 is "0", the LCD controller 31 outputs the first game image drawn in the first VRAM 28 to the first LCD 11, and outputs the second game image drawn in the second VRAM 29 to the second LCD 12. When the value in the register 32 is "1", the LCD controller 31 outputs the first game image drawn in the first VRAM 28 to the second LCD 12, and outputs the second game image drawn in the second VRAM 29 to the first LCD 11.

The wireless communication section 33 has a function of transferring data used for game processing or other data with a wireless communication section 33 of another game apparatus. The real-time clock 34 outputs a signal representing the current time.

The above-described structure of the game apparatus 10 is merely exemplary. The present invention is applicable to any computer system. A game program according to the present invention may be supplied to a computer system via an external storage medium such as the memory card 17 or the like, or via a wired or wireless communication line. The game program may be pre-stored on a non-volatile storage device in the computer system.

An overview of a game executable by the game apparatus 10 will be described.

Figure 3:
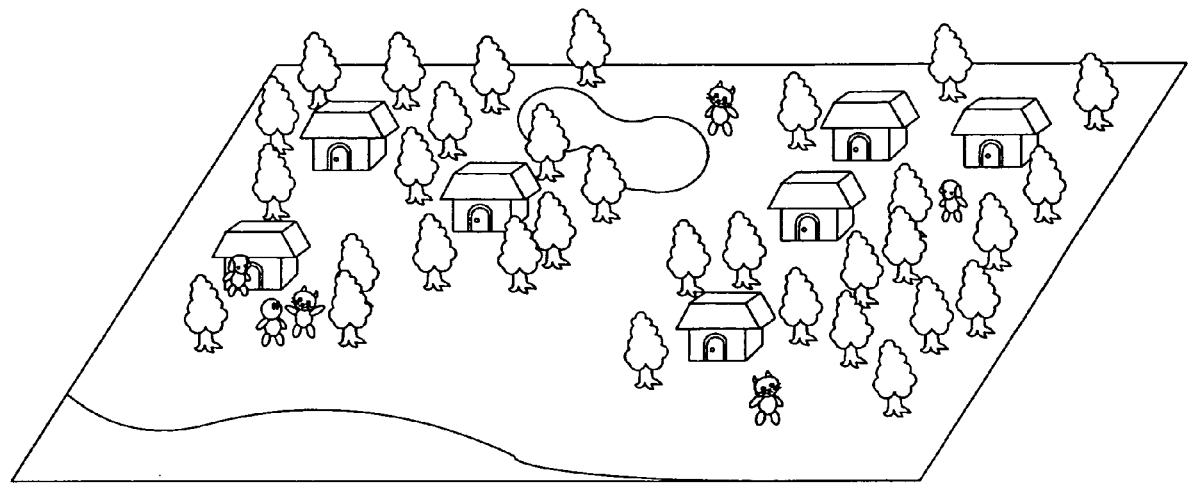
FIG. 3 shows the entirety of a game world.

FIG. 3 shows a game world. There are trees, a pond, the sea and houses in the game world. A plurality of characters live in this game world.

Figure 4:
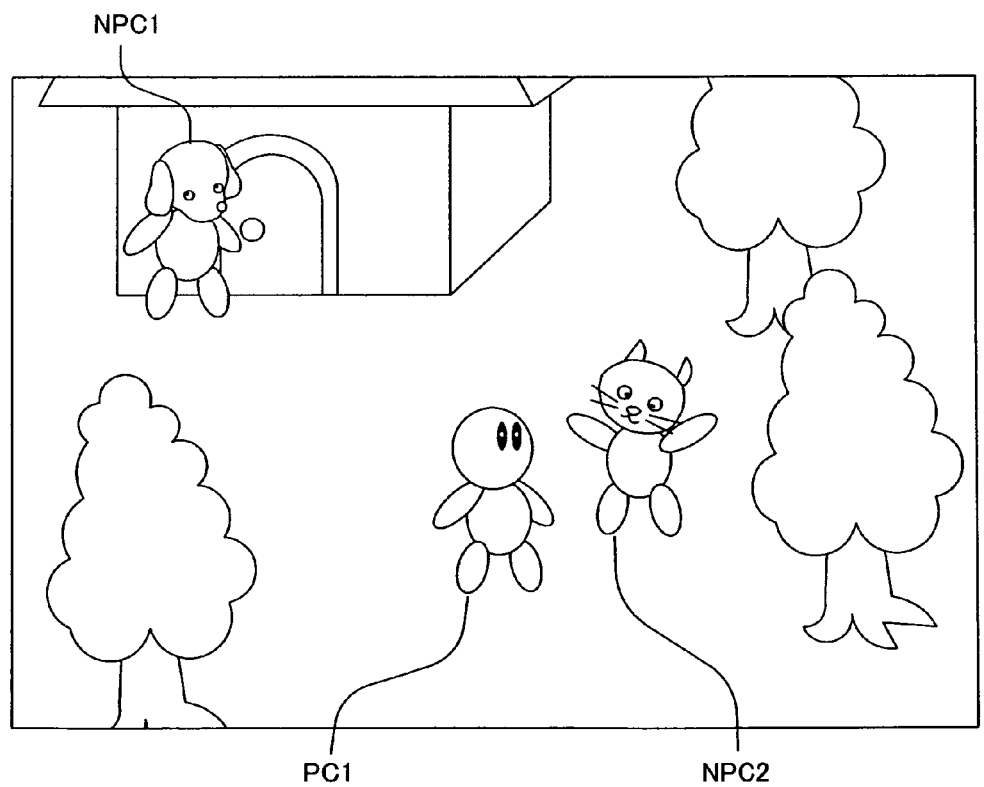
FIG. 4 shows an example of a game image displayed on a screen of a second LCD 12.

FIG. 4 shows an example of a game image displayed on the screen of the second LCD 12. On the screen of the second LCD 12, a part of the game world shown in FIG. 3 is displayed. In the example of FIG. 4, among the plurality of characters living in the game world, a player character PC1 operable by a player and two non-player characters NPC1 and NPC2 operable by a computer are displayed.

The player can instruct the player character to move or act by operating the operation switch section 14. The range of the game world displayed on the screen of the second LCD 12 depends on the position of the player character in the game world. Basically, the player character is always displayed on the screen.

The player character can perform a variety of types of acts based on an instruction of the player. For example, the player character can do fishing, hunt for bugs, dig up fossil, shake a tree, or pull out weeds.

The above-mentioned acts of the player character can be roughly classified into boom triggering acts and non-hobby acts.

Figure 5:
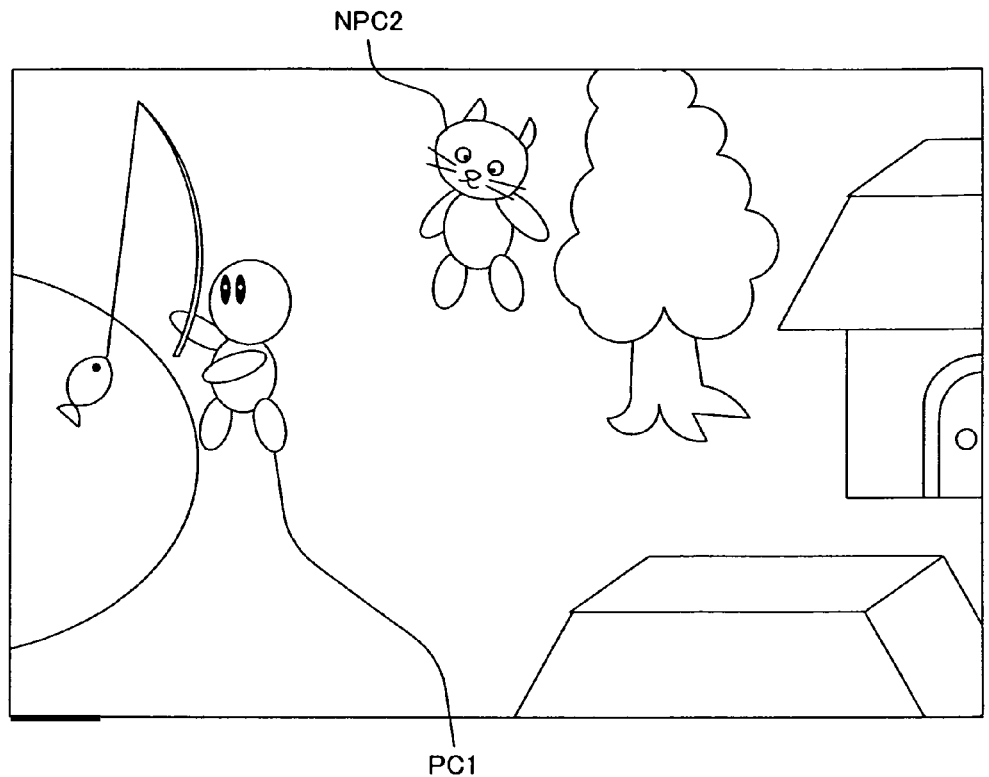
FIG. 5 shows another example of the game image displayed on the screen of the second LCD 12.
Figure 6:
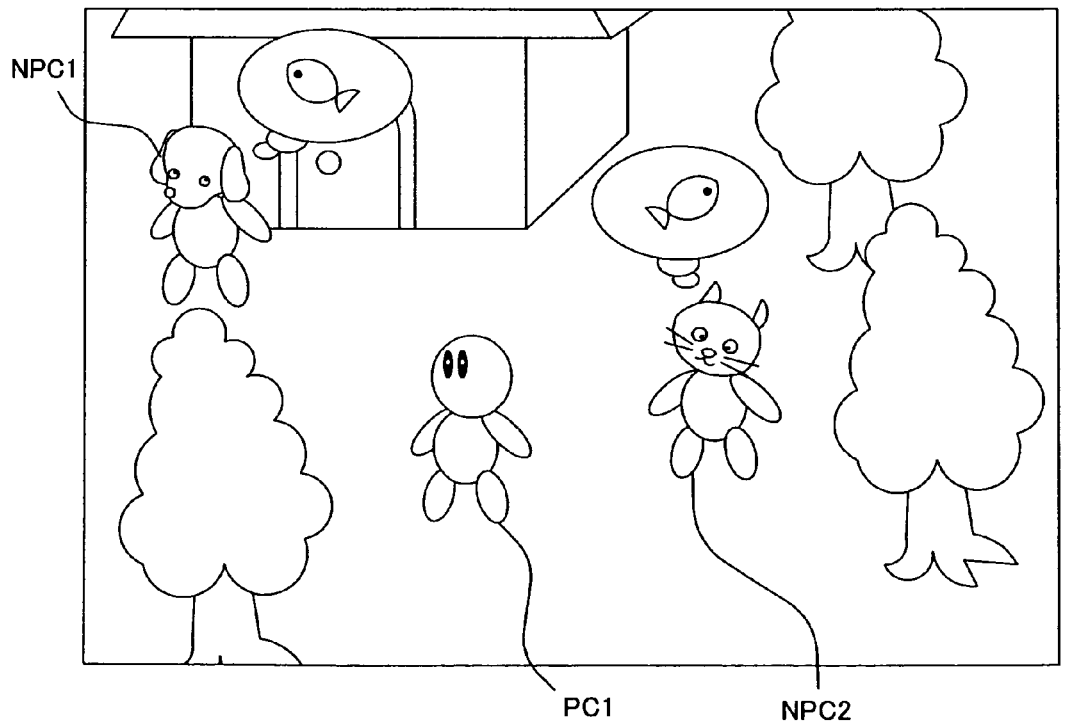
FIG. 6 shows still another example of the game image displayed on the screen of the second LCD 12.

A boom triggering act is an act which, when performed continually by the player character, causes the non-player characters to perform an act related thereto. Specific examples of the boom triggering act include seven acts of doing fishing, hunting for bugs, digging up fossil, obtaining clothes, obtaining furniture, planting flowers, and collecting sea shells on the beach. For example, when the player character PC1 frequency fishes as shown in FIG. 5, that act influences the non-player characters in the game world. In some time, as shown in FIG. 6, the non-player characters get interested in fish and perform an act related to fish. Herein, such a state of the non-player characters is referred to as a "fish boom". Examples of the fish-related act include fishing, asking the player character PC1 for fish, and keeping fish in their houses. Another example of the state of the non-player characters which can be caused by the act of the player character PC1 may be a "flower boom". Examples of the act of the non-player characters in the "flower boom" include planting flowers around their houses and asking the player character PC1 for flowers. As described above, a boom triggering act is an act of the player character which causes a trend in the game world.

A non-hobby act is an act of the player character other than the boom triggering acts. Specific examples of the non-hobby act include shaking a tree, pulling out weeds, running around, and talking with a non-player character. Being still without doing anything specific is also classified as a non-hobby act. When the player character PC1 frequently performs a non-hobby act, the non-player characters become uninterested in anything in some time. Herein, such an act of the non-player characters is referred to as a "non-hobby boom".

As described above, an act of a player character PC1 influences the act of the non-player characters. This makes the player feel close to the non-player characters.

Hereinafter, an operation of the game apparatus 10 for realizing the above-described game will be described in detail.

Figure 7:
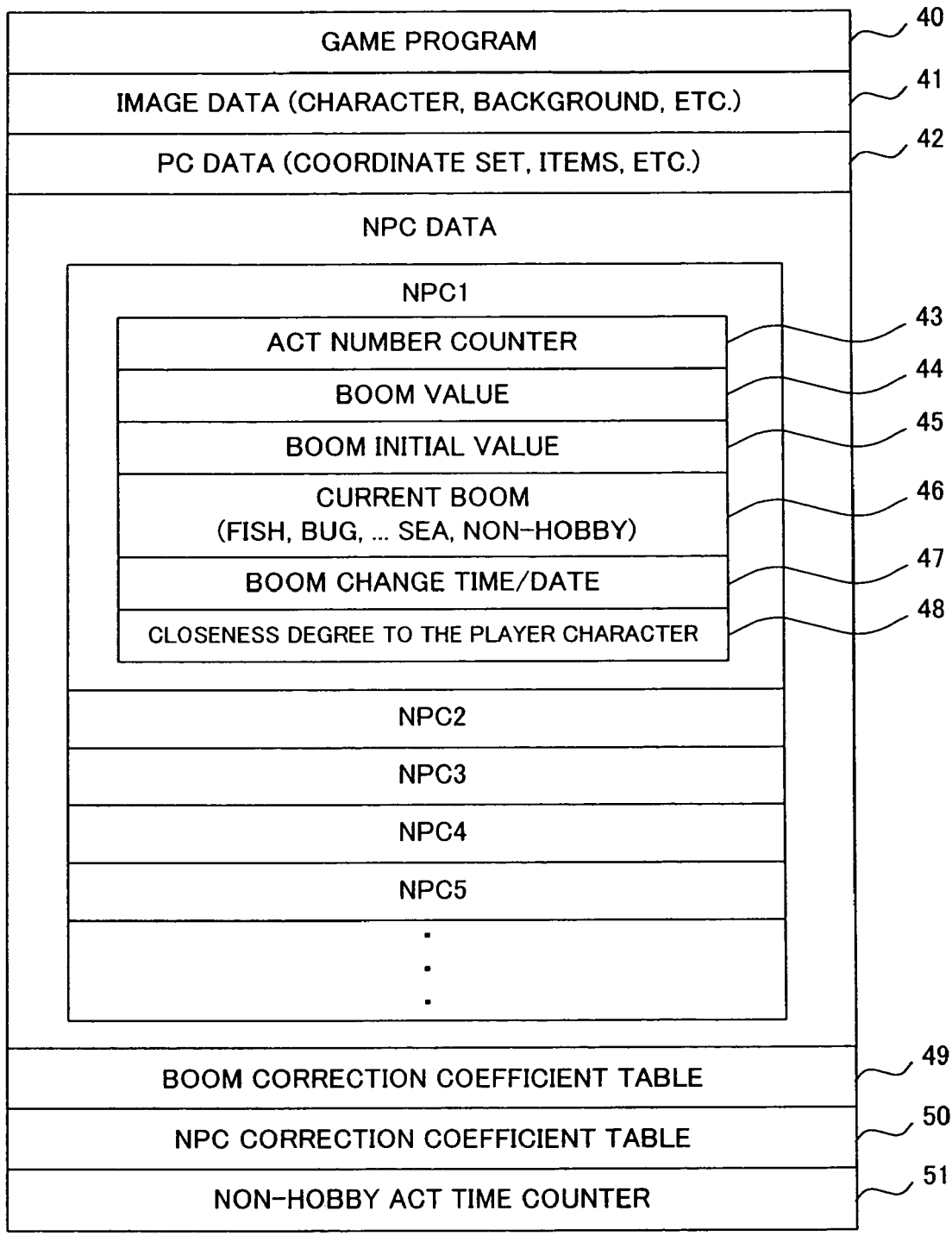
FIG. 7 is a memory map of a RAM 24.

FIG. 7 is an exemplary memory map of the RAM 24. The RAM 24 stores a game program 40, image data 41, PC data 42, NPC data, a boom correction coefficient table 49, an NPC correction coefficient table 50, and a non-hobby act time counter 51.

The game program 40 is loaded from the ROM 17a of the memory card 17 to the RAM 24 at the start of the game and is executed by the CPU core 21.

The image data 41 is image data on the ground, the trees, the houses, the pond, the player character and the non-player characters included in the game world.

The PC data 42 is data on the player character, and represents, for example, the coordinate set indicating the position of the player character in the game world and items held by the player character.

The NPC data is data on the non-player characters, and includes information on an act number counter 43, a boom value 44, a boom initial value 45, a current boom 46, a boom change time/date 47, and a closeness degree 48 to the player character for each non-player character.

The act number counter 43 counts the number of times that an act of each boom has been performed by the player character. The booms are classified into eight booms shown in FIG. 8; i.e., fish, bug, fossil, clothes, furniture, flower, sea, and non-hobby. For example, when the player character catches a fish, "1" is added to the value of the act number counter 43 for the fish boom of all the non-player characters existing the game world at that point. Similarly, when the player character plants a flower, "1" is added to the value of the act number counter 43 for the flower boom of all the non-player characters existing in the game world at that point. Each act number counter 43 has an upper limit (for example, 10). Therefore, after the value of the act number counter 43 for the fish boom of one non-player character reaches 10, the value remains 10 even if the player character catches a fish.

The boom value 44 is used to determine the boom into which each non-player character will be placed next. As shown in FIG. 8, the boom value 44 is counted for each boom independently. To the boom value 44 for each boom, a value based on the value of the corresponding act number counter 43 is added at a predetermined timing. Each boom value 44 has an upper limit (for example, 255). For example, when the boom value 44 for each boom of a non-player character is updated based on the corresponding act number counter 43 and as a result, the boom value 44 for the fish boom of that non-player character reaches 255, the state of that non-player character is changed to the fish boom. Similarly, when the boom value 44 for each boom of a non-player character is updated based on the corresponding act number counter 43 and as a result, the boom value 44 for the non-hobby boom of that non-player character reaches 255, the state of that non-player character is changed to the non-hobby boom.

The boom initial value 45 is information which represents the initial value of the boom value for each boom when each non-player character first appears in the game world. Each boom initial value 45 is a fixed value. All the non-player characters do not exist from the start in the game world, but most of the non-player characters move into the game world shown in FIG. 3 (where the player character lives) during the game. The boom initial value 45 represents the boom value for each boom of a non-player character when that non-player character moves into the game world.

The current boom 46 is information representing in which boom each non-player character is currently in.

The boom change time/date is information representing when the boom of each non-player character has changed.

The closeness degree 48 to the player character is information on the closeness of each non-player character to the player character. The closeness degree is increased by the player character talking to that non-player character or the player character fulfilling a desire of that non-player character.

The boom correction coefficient table 49 is a table having a correction coefficient used for updating the boom value 44 based on the value of the act number counter 43. Specifically, as shown in FIG. 9, the boom correction coefficient table 49 shows a boom correction coefficient for each boom. Each boom correction coefficient is a predetermined fixed value.

The NPC correction coefficient table 50 is a table having a correction coefficient used for updating the boom value 44 based on the value of the act number counter 43. Specifically, as shown in FIG. 10, the NPC boom correction coefficient table 50 shows an NPC correction coefficient for each non-player character and for each boom. Each NPC correction coefficient is a predetermined fixed value.

The non-hobby act time counter 51 counts a time duration in which the player character remains still without doing any boom triggering act.

Next, with reference to the flowcharts in FIG. 11 through FIG. 18, a flow of processing performed by the CPU core 21 based on the game program 40 will be described.

Figure 11:
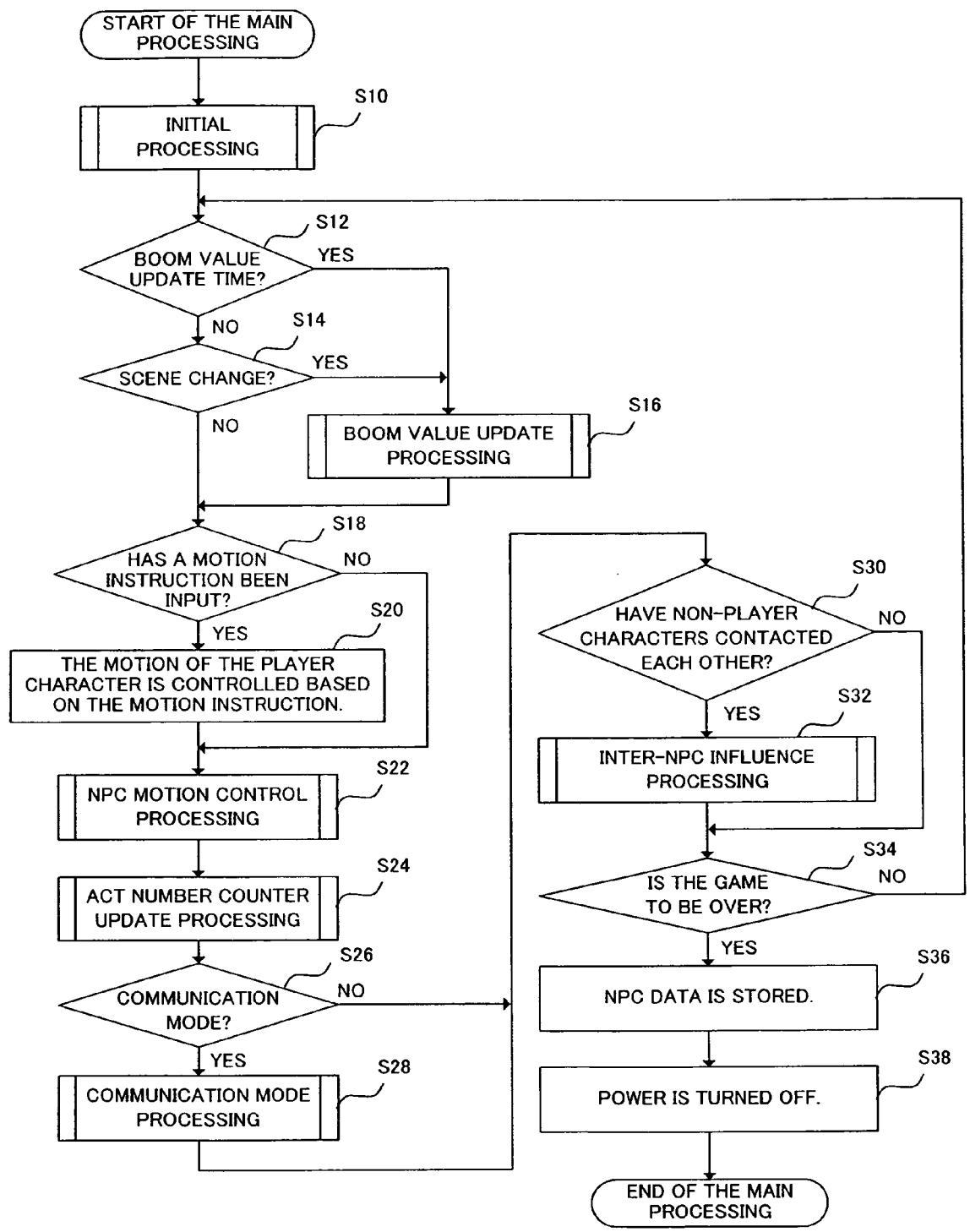
FIG. 11 is a flowchart illustrating a flow of main processing.
Figure 12:
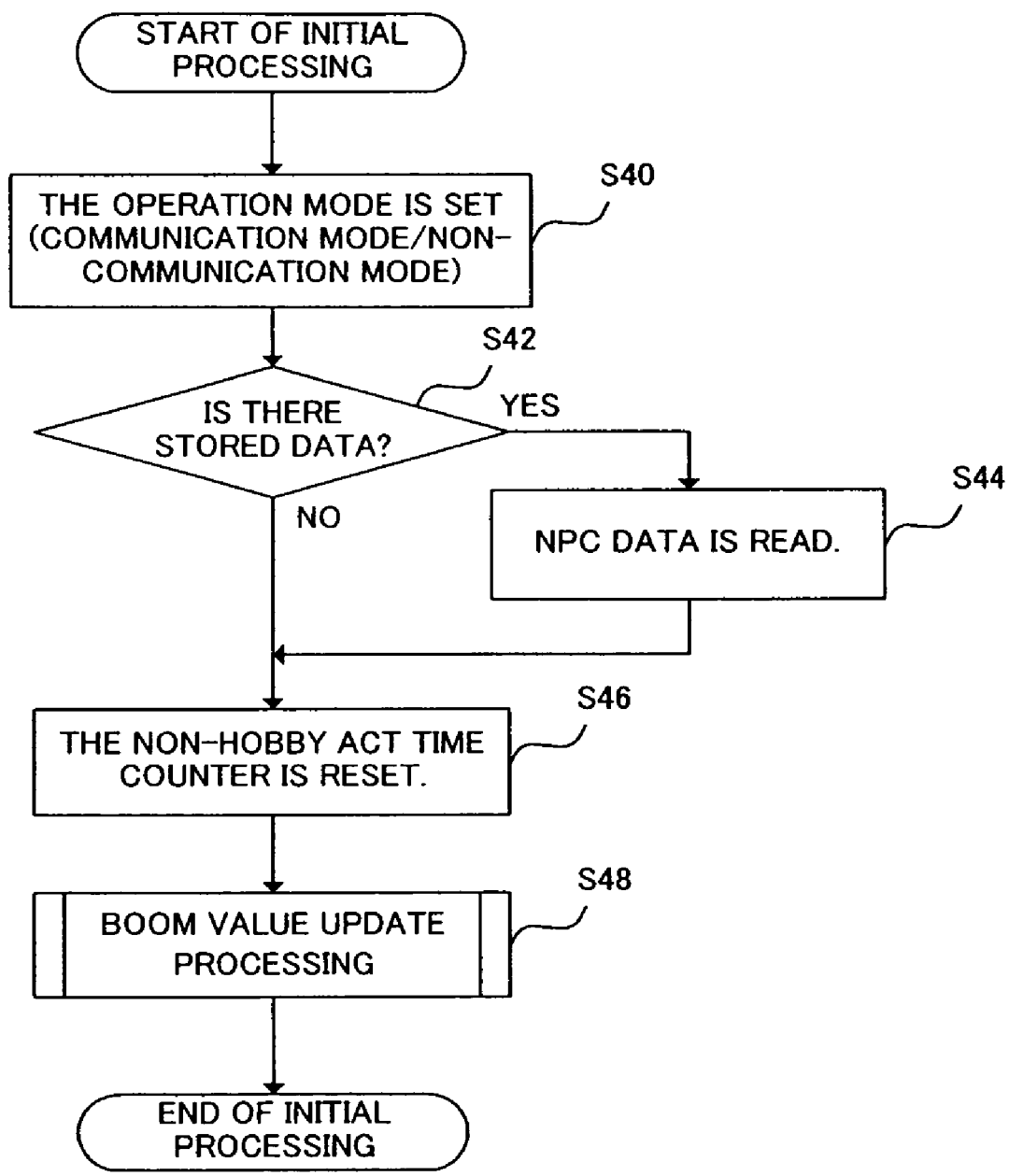
FIG. 12 is a flowchart illustrating a flow of initial processing.

FIG. 11 is a flowchart illustrating a flow of main processing. Referring to FIG. 11, at the start of the main processing, the CPU core 21 performs initial processing in step FIG. 12 is a flowchart illustrating the initial processing in detail. As shown in FIG. 12, in step S40, the CPU core 21 sets an operation mode to a communication mode. In the communication mode, game data is transferred between two or more game apparatuses which are connected to each other, so that a plurality of players can play the game together in the same game world. When the game is started with the operation mode being set to the communication mode in step S40, characters operated by additional players (hereinafter, referred to as "communication partner characters") can join the game at any time during the game. By contrast, when the game is started with the operation mode being set to a non-communication mode in step S40, characters operated by additional players cannot join the game during the game.

In step S42, it is determined whether or not the RAM 17b of the memory card 17 has stored data. When the RAM 17b has stored data, the processing advances to step S44; whereas when the RAM 17b do not have any stored data, the processing advances to step S46. The stored data refers to game data stored in the RAM 17b of the memory card 17 in step S36 in FIG. 11 described later.

In step S44, the game data including the NPC data stored in the RAM 17b of the memory card 17 is read into the RAM 24.

In step S46, the non-hobby act time counter 51 is reset to 0.

In step S48, the boom value update processing is executed. By the boom value update processing, the boom value 44 is updated based on the value of the act number counter 43 for all the non-player characters.

Figure 13:
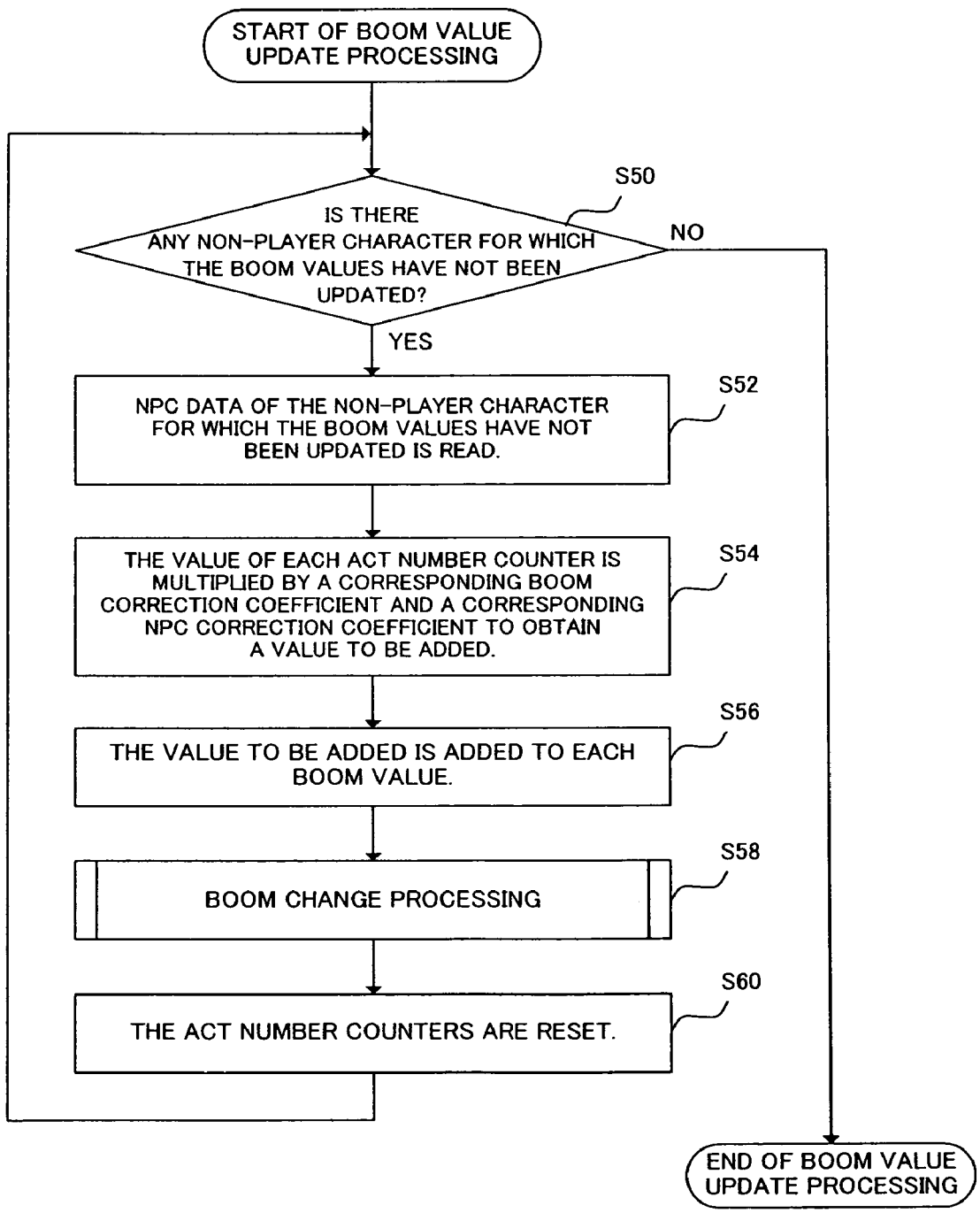
FIG. 13 is a flowchart illustrating a flow of boom value update processing.

FIG. 13 is a flowchart illustrating the boom value update processing in detail. As shown in FIG. 13, in step S50, the CPU core 21 determines whether or not there is a non-player character for which the boom values 44 have not been updated. When there is such a non-player character, the processing advances to step S52. When the boom values 44 have been updated for all the non-player characters, the boom value update processing is terminated.

In step S52, the NPC data of the non-player character for which the boom values 44 have not been updated is read from the RAM 24 as the NPC data of the processing target non-player character.

In step S54, the value of the act number counter 43 for each boom represented by the NPC data which was read in step S52 is multiplied by a corresponding boom correction coefficient and a corresponding NPC correction coefficient to obtain a value to be added. For example, for obtaining the value to be added for the fish boom of the non-player character NPC2, the value of the act number counter 43 for the fish boom of the non-player character NPC2 (6 in the example of FIG. 8) is multiplied by the boom correction coefficient for the fish boom (3 in the example of FIG. 9) and the NPC correction coefficient for the fish boom of the non-player character NPC2 (1.1 in the example of FIG. 10). As a result, the value to be added ($6 \times 3 \times 1.1 = 19.8$ in this case) is obtained. Similarly, for obtaining the value to be added for the furniture boom of the non-player character NPC3, the value of the act number counter 43 for the furniture boom of the non-player character NPC3 (1 in the example of FIG. 8) is multiplied by the boom correction coefficient for the furniture boom (3 in the example of FIG. 9) and the NPC correction coefficient for the fish boom of the non-player character NPC3 (3 in the example of FIG. 10). As a result, the value to be added ($1 \times 3 \times 3 = 9$ in this case) is obtained.

In step S56, the boom value 44 for each boom represented by the NPC data which was read in step S52 is added to the value to be added calculated in step S54, and the data in the RAM 24 is over written by the addition result. For example, the boom value 44 for the fish boom of the non-player character NPC2 (251 in the example of FIG. 8) is added to the value to be added "19.8". In this case, the addition result exceeds the upper limit of 255. Therefore, the post-update boom value 44 is 255. Similarly, the boom value 44 for the furniture boom of the non-player character NPC3 (126 in the example of FIG. 8) is added to the value to be added "9". The post-update boom value is 135.

In step S58, boom change processing is executed. By the boom change processing, the boom of each non-player character is changed when necessary based on the updating result of step S56.

Figure 14:
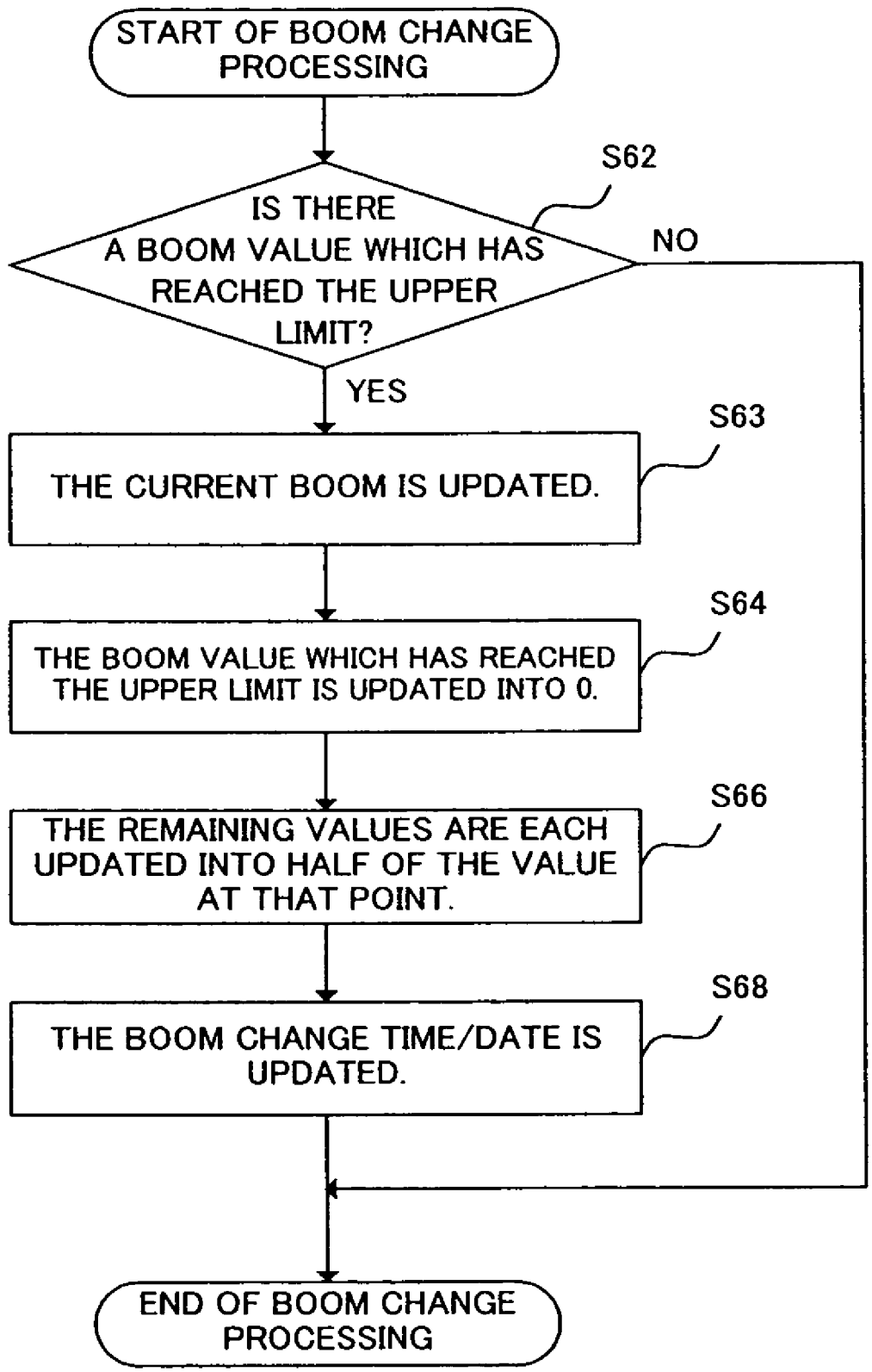
FIG. 14 is a flowchart illustrating a flow of boom change processing.

FIG. 14 is a flowchart illustrating the boom change processing in detail. As shown in FIG. 14, in step S62, the CPU core 21 determines whether or not there is a boom value 44 which has reached the upper limit as a result of being updated in step S56. When there is such a boom value 44, the processing advances to step S63. When there is no such boom value 44, the boom change processing is terminated.

In step S63, the current boom 46 of the processing target non-player character is updated into a boom for which the boom value 44 has reached the upper limit. For example, when the boom value 44 for the fish boom of the non-player character NPC2 has reached 255, the current boom 46 of the non-player character NPC2 is updated into the fish boom.

In step S64, the boom value 44 which has reached the upper limit is updated into 0.

In step S66, the boom values 44 of the processing target non-player character except for the boom value 44 which was updated into 0 in step S64 are each updated into half of the value at that point.

In step S68, the boom change time/date 47 of the processing target non-player character is overwritten by the time indicated by the real-time clock 34.

When the boom change processing is finished, the processing advances to step S60 in FIG. 13.

In step S60, the act number counters 43 of the processing target non-player character are all reset to 0.

When the boom value update processing is finished for all the non-player characters, the boom value update processing is terminated.

When the boom value update processing in step S48 in FIG. 12 is terminated, the initial processing is terminated and the processing advances to step S12 in FIG. 11.

In step S12, it is determined, by referring to the time indicated by the real-time clock 34, whether or not a predetermined boom value update time at which the boom values 44 of each non-player character need to be periodically updated (for example, 6 a.m.) has come. When such a time has come, the processing advances to step S16; whereas when such a time has not come yet, the processing advances to step S14.

In step S14, it is determined whether or not a scene change has occurred by, for example, the player character entering or coming out of the house. When a scene change has occurred, the processing advances to step S16; whereas when no scene change has occurred, the processing advances to step S18.

In step S16, the boom value update processing is executed as described above.

As is clear from the above description, the boom value update processing is basically executed when the game is started (including when the game is resumed using the stored data), when the boom value update time has come, and when a scene change has occurred. The boom value update is not executed in real time for the following reason. If a non-player character is placed into, for example, the fish boom immediately after the player character catches a large number of fish within a short time, the player is not convinced that the player character's act set a trend in the game world but rather feels that something is wrong or unnatural. For the same reason, the act number counter 43 has an upper limit (which is significantly lower than the upper limit of the boom value 44). The above settings are provided in order to prevent an act of the player character from immediately influencing the act of the non-player characters, so that the player does not feel that something unnatural occurs.

In step S18, it is determined through the operation switch section 14 or the touch panel 15 whether or not a motion instruction has been input by the player. When a motion instruction has been input, the processing advances to step S20; whereas when no motion instruction has been input, the processing advances to step S22.

In step S20, the motion of the player character is controlled by the motion instruction from the player.

In step S22, NPC motion control processing is executed. By the NPC motion control processing, motions of the non-player characters are controlled.

Figure 15:
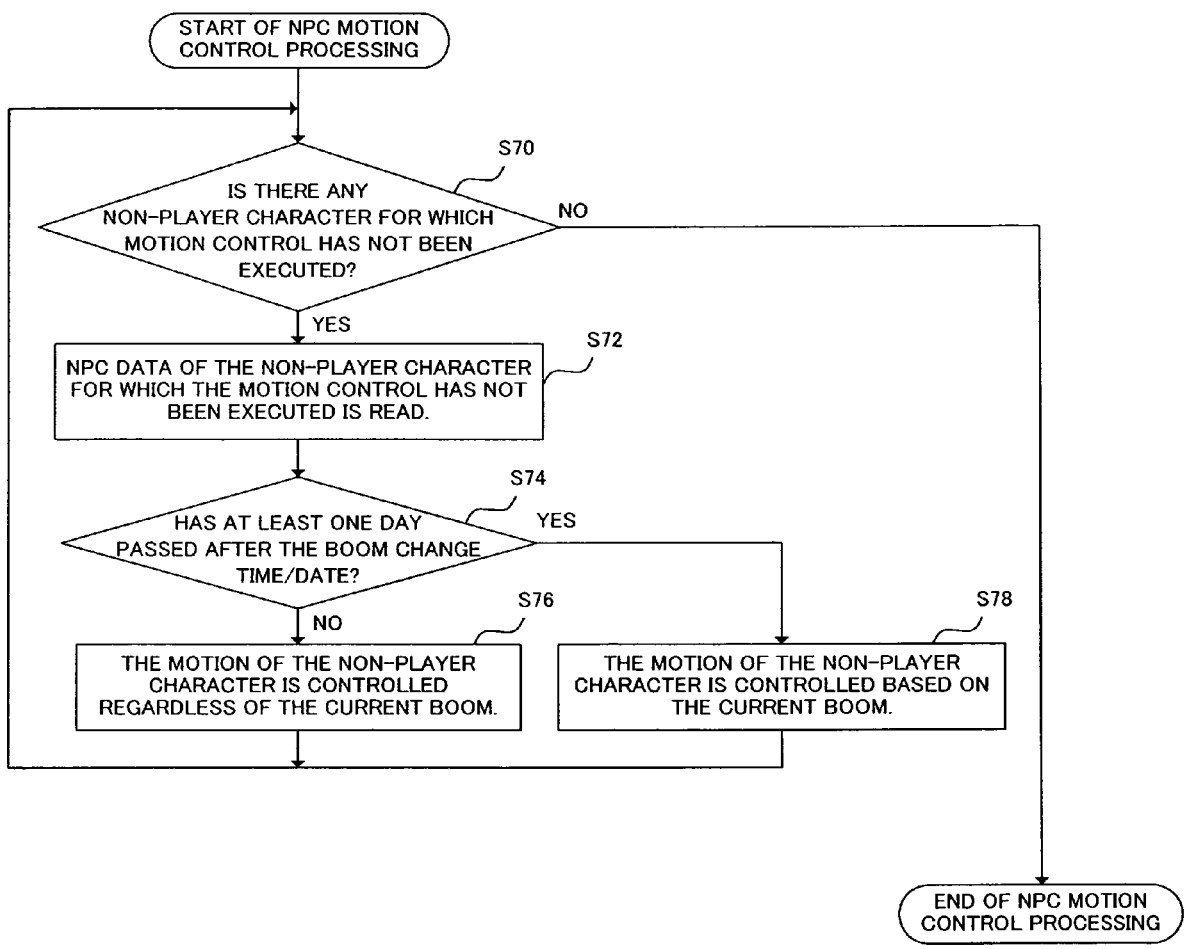
FIG. 15 is a flowchart illustrating a flow of NPC motion control processing.

FIG. 15 is a flowchart illustrating the NPC motion control processing in detail. As shown in FIG. 15, in step S70, the CPU core 21 determines whether or not there is a non-player character for which motion control has not been executed. When there is such a non-player character, the processing advances to step S72; whereas when there is no such non-player character, the NPC motion control processing is terminated.

In step S72, the NPC data of the non-player character for which the motion control has not been executed is read from the RAM 24 as the NPC data of the processing target non-player character.

In step S74, the boom change time/date 47 of the NPC data which was read in step S72 is compared with the current time indicated by the real-time clock 34 to determine whether or not at least one day has passed after the boom change time/date. When at least one day has passed after the boom change time/date, the processing advances to step S78; whereas when one day has not passed yet, the processing advances to step S76.

In step S76, the motion of the processing target non-player character is controlled regardless of the current boom 46 of that non-player character. For example, the non-player character is controlled to say to himself/herself "I wish I can find something interesting" or "What am I going to spend my time next?".

In step S78, the processing target non-player character is controlled to perform a motion related to the current boom 46 of that non-player character. For example, where the boom 46 is the fish boom, the non-player character is controlled to do fishing, ask the player character for fish, or keep fish in its house. Where the boom 46 is the flower boom, the non-player character is controlled to plant flowers around its house or ask the player character for flowers.

As described above, the non-player character is controlled not to perform a motion related to the current boom until one day passes after a boom change occurs. Such a setting is provided in order to prevent a situation where the target of interest of the non-player character suddenly changes and the player finds it unnatural.

When the motion control processing is finished for all the non-player characters, the NPC motion control processing is terminated and the processing advances to step S24 in FIG. 11.

In step S24, act number counter update processing is executed. By the act number counter update processing, the act number counters 43 of each non-player character are updated in real time in accordance with the act of the player character.

Figure 16:
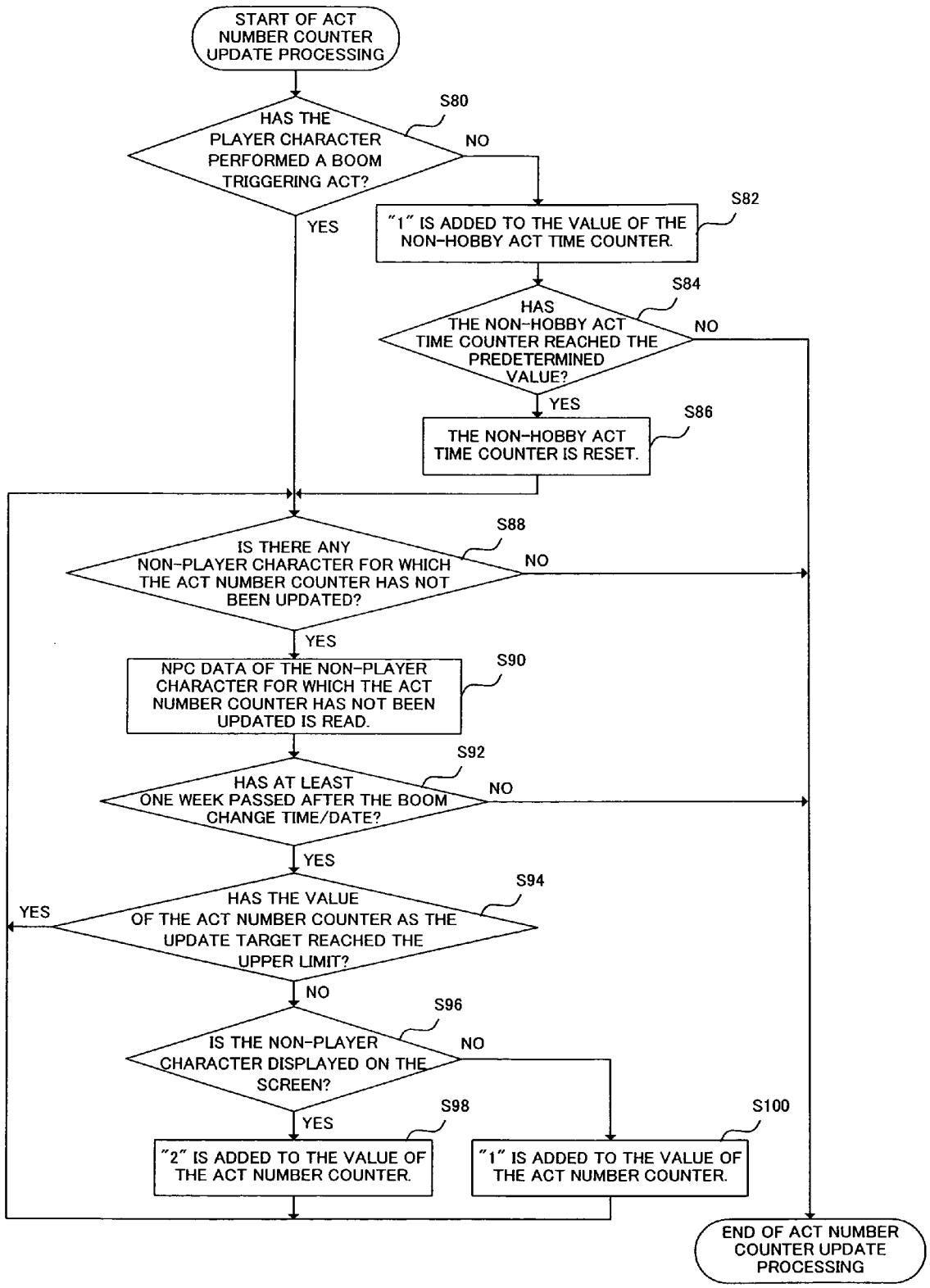
FIG. 16 is a flowchart illustrating a flow of act number counter update processing.

FIG. 16 is a flowchart illustrating the act number counter update processing in detail. As shown in FIG. 16, in step S80, the CPU core 21 determines whether or not the player character has performed a boom triggering act. When the player character has performed a boom triggering act, the processing advances to step S88; whereas when the player character has not performed any boom triggering act, the processing advances to step S82.

In step S82, "1" is added to the value of the non-hobby act time counter 51.

In step S83, it is determined whether or not the value of the non-hobby act time counter 51 has reached a predetermined value (for example, 3600). When the value has reached the predetermined value, the processing advances to step S86; whereas the value has not reached the predetermined value, the act number counter update processing is terminated.

In step S86, the non-hobby act time counter 51 is reset to 0.

In step S88, it is determined whether or not there is a non-player character for which the act number counter 43 has not been updated. When there is such a non-player character, the processing advances to step S90; whereas when there is no such non-player character, the act number counter update processing is terminated.

In step S90, the NPC data of a non-player character for which the act number counter 43 has not been updated is read from the RAM 24 as the NPC data of the processing target non-player character.

In step S92, the boom change time/date 47 of the NPC data which was read in step S90 is compared with the current time indicated by the real-time clock 34 to determine whether or not at least one week has passed after the boom change time/date. When at least one week has passed after the boom change time/date, the processing advances to step S94; whereas when one week has not passed yet, the act number counter update processing is terminated.

As described above, the act number counter 43 is not updated until one week passes after a boom change occurs. Such a setting is provided in order to prevent a situation where within a week after the boom of the non-player character changed, another boom change occurs.

In step S94, it is determined whether or not the value of the act number counter 43 as the update target (i.e., among the act number counters 43 of the processing target non-player character, the act number counter 43 for the boom corresponding to the boom triggering act or the non-hobby act performed by the player character) has reached the upper limit. When the value has reached the upper limit, the processing returns to step S88; whereas when the value has not reached the upper limit, the processing advances to step S96.

In step S96, it is determined whether or not the processing target non-player character is displayed on the screen of the second LCD 12. When the non-player character is displayed, the processing advances to step S98; whereas when the non-player character is not displayed, the processing advances to step S100. This determination can be made, for example, based on the coordinate set representing the position of the non-player character in the game world.

In step S98, "2" is added to the value of the act number counter 43 as the update target.

In step S100, "1" is added to the value of the act number counter 43 as the update target.

As described above, the value to be added to the value of the act number counter 43 is varied depending on whether or not the processing target non-player character is displayed on the screen of the second LCD 12. Such a setting is provided in order to allow the non-player character which is displayed on the screen of the second LCD 12 (i.e., the non-player character located close to the player character) to be more easily influenced by the act of the player character than the non-player character which is not displayed on the screen of the second LCD 12 (i.e., the non-player character located far from the player character).

When the act number counters 43 are updated for all the non-player characters, the act number counter update processing is terminated and the processing advances to step S26 in FIG. 11.

In step S26, it is determined whether or not the operation mode is set to the communication mode. When the operation mode is set to the communication mode, the processing advances to step S28; whereas when the operation mode is not set to the communication mode, the processing advances to step S30.

In step S28, communication mode processing is executed.

Figure 17:
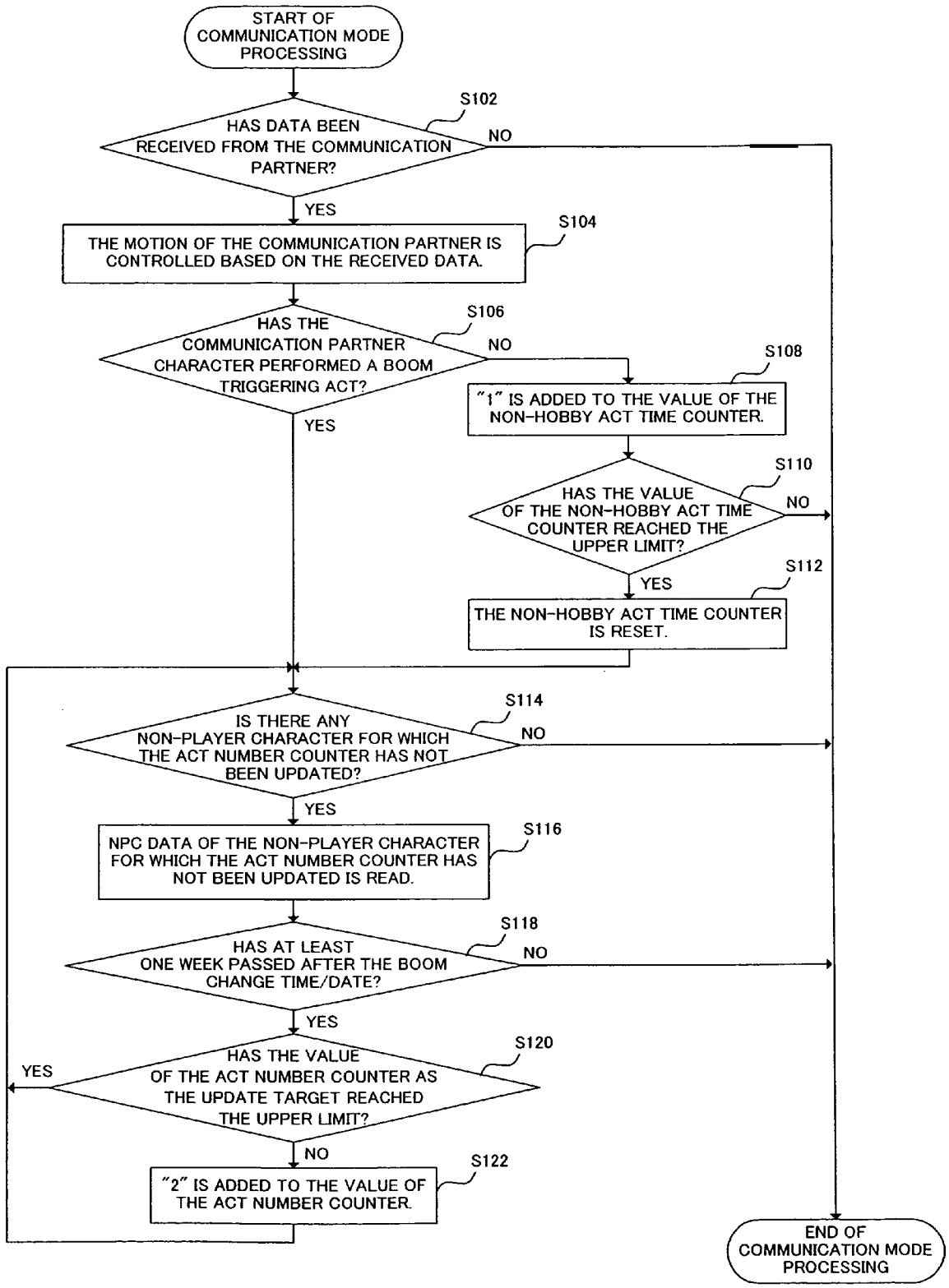
FIG. 17 is a flowchart illustrating a flow of communication mode processing.

FIG. 17 is a flowchart illustrating the communication mode processing in detail. As shown in FIG. 17, in step S102, the CPU core 21 determines through the wireless communication section 33 whether or not data has been received from another game apparatus as a communication partner. When data has been received, the processing advances to step S104; whereas when no data has been received, the communication mode processing is terminated.

In step S104, the motion of the player character of the communication partner (hereinafter, referred to simply as the "communication partner character") in the game world is controlled based on the data received from the communication partner.

In step S106, it is determined whether or not the communication partner character has performed a boom triggering act. When the communication partner character has performed a boom triggering act, the processing advances to step S114; whereas when the communication partner character has not performed any boom triggering act, the processing advances to step S108.

In step S108, "1" is added to the value of the non-hobby act time counter of the communication partner character (prepared in the RAM 24 separately from the non-hobby act time counter 51 shown in FIG. 7).

In step S110, it is determined whether or not the value of the non-hobby act time counter of the communication partner character has reached a predetermined value (for example, 3600). When the value has reached the predetermined value, the processing advances to step S112; whereas when the value has not reached the predetermined value, the communication mode processing is terminated.

In step S112, the non-hobby act time counter of the communication partner character is reset to 0.

In step S114, it is determined whether or not there is a non-player character for which the act number counter 43 has not been updated. When there is such a non-player character, the processing advances to step S116; whereas when there is no such non-player character, the communication mode processing is terminated.

In step S116, the NPC data of the non-player character for which the act number counter 43 has not been updated is read from the RAM 24 as the NPC data of the processing target non-player character.

In step S118, the boom change time/date 47 of the NPC data which was read in step S116 is compared with the current time indicated by the real-time clock 34 to determine whether or not at least one week has passed after the boom change time/date. When at least one week has passed, the processing advances to step S120; whereas when one week has not passed yet, the communication mode processing is terminated.

In step S120, it is determined whether or not the value of the act number counter 43 as the update target (i.e., among the act number counters 43 of the processing target non-player character, the act number counter 43 for the boom corresponding to the boom triggering act or the non-hobby act performed by the communication partner character) has reached the upper limit. When the value has reached the upper limit, the processing returns to step S114; whereas when the value has not reached the upper limit, the processing advances to step S122.

In step S122, "2" is added to the value of the act number counter 43 as the update target. The influence exerted by the act of the communication partner character on each non-player character is set to be twice the influence exerted by the act of the player character on the non-player character. Such a setting is provided in order to indicate that each non-player character has a strong interest in the player character unfamiliar thereto (communication partner character).

In this embodiment, in step S122, "2" is added to the value of the act number counter 43 as the update target regardless of the positional relationship between the communication partner character and each non-player character. Alternatively, as in steps S96 and S98 in FIG. 16, the value to be added may be varied in accordance with whether the non-player character is located close to or far from the communication partner character.

When the act number counter update processing is finished for all the non-player characters, the communication mode processing is terminated and the processing advances to step S30 in FIG. 11.

In step S30, it is determined whether or not two non-player characters contacted each other in the game world. When two non-player characters contacted each other, the processing advances to step S32; whereas when no non-player characters contacted each other, the processing advances to step S34.

In step S32, inter-NPC influence processing is executed.

Figure 18:
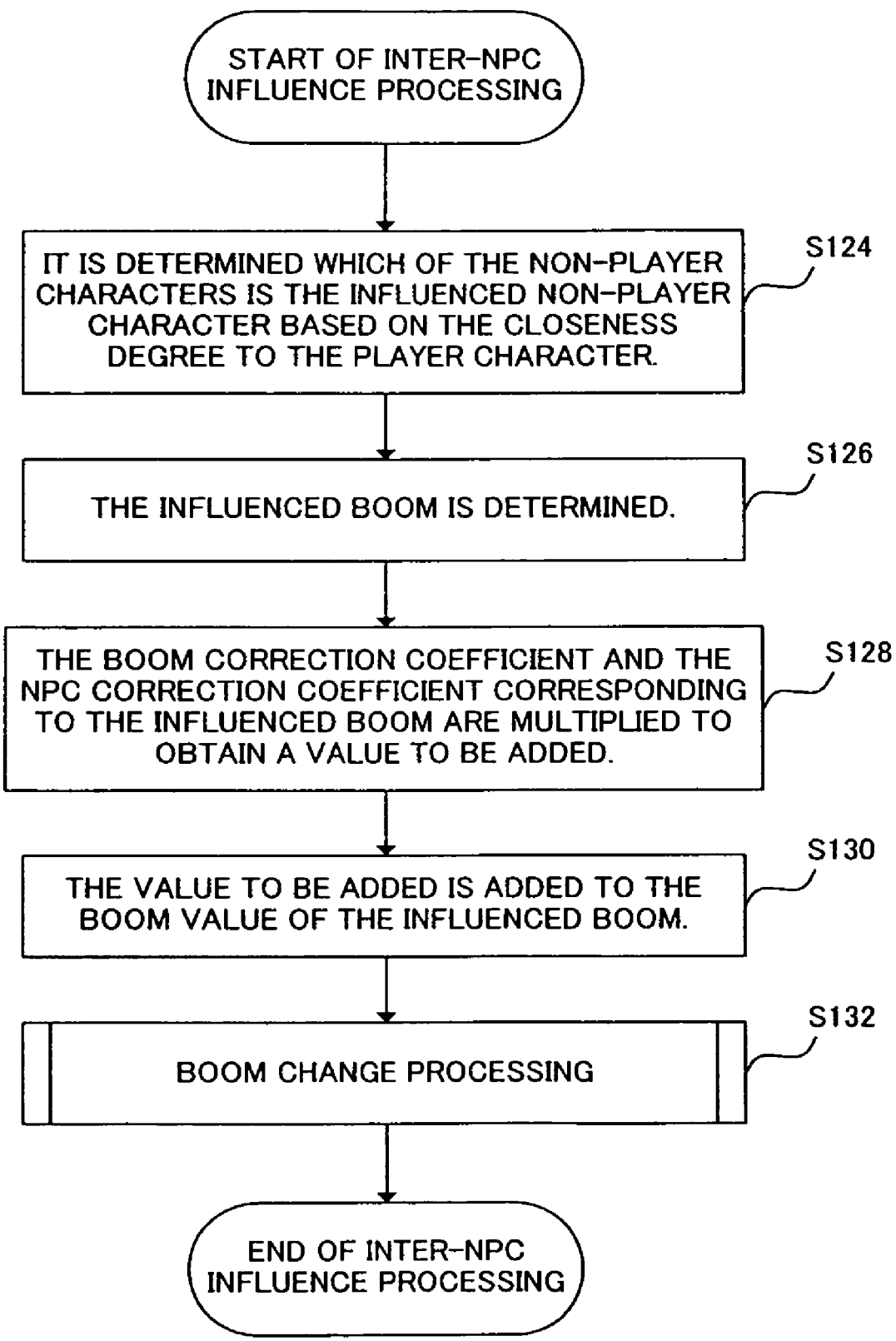
FIG. 18 is a flowchart illustrating a flow of inter-NPC influence processing.

FIG. 18 is a flowchart illustrating the inter-NPC influence processing in detail. As shown in FIG. 18, in step S124, the CPU core 21 compares the closeness degrees 48 to the player character of the two non-player characters which contacted each other. The CPU core 21 determines the non-player character having a higher closeness degree to the player character as the "influencing non-player character" and the non-player character having a lower closeness degree to the player character as the "influenced non-player character".

In step S126, each boom value 44 of the influencing non-player character is referred to, and the boom having the highest boom value is determined as the "influenced boom".

In step S128, the boom correction coefficient and the NPC correction coefficient corresponding to the influenced boom are multiplied to obtain a value to be added. For example, in the case where the influenced non-player character is the non-player character NPC3 and the influenced boom is the sea boom, the value to be added is calculated as 2×1.1=2.2 based on the boom correction coefficient table 49 in FIG. 9 and the NPC correction coefficient table 50 in FIG. 10.

In step S130, the value to be added calculated in step S128 is added the boom value 44 for the influenced boom represented by the NPC data of the influenced non-player character. In the above example, 2.2 is added to the boom value 44 for the sea boom of the non-player character NPC3.

In step S132, the boom change processing is executed for the influenced non-player character as the processing target. As a result, by the inter-NPC influence processing, the boom of the influenced non-player character may be changed in real time. When the boom change processing is finished, the inter-NPC influence processing is terminated and the processing advances to step S34 in FIG. 11.

In step S34, it is determined whether or not the game is to be over. When the game is to be over, the processing advances to step S34; whereas when the game is not to be over, the processing returns to step S12.

In step S36, the game data including the NPC data or the like is stored in the ROM 17b of the memory card 17.

In step S38, the game apparatus 10 is turned off. Thus, the main processing is terminated.

As described above, according to this embodiment, the act of each non-player character is changed in accordance with the act performed by the player character in the game world. Thus, the player obtains a fresh feeling that the act of the player character set a trend in the game world and is also made to feel close to the non-player characters.

The act number counter 43 for counting the number of times that the player character has performed a boom triggering act or a non-hobby act is provided for each non-player character. Owing to this arrangement, the act of the player character can be prevented from influencing the non-player characters which have not appeared in the game world yet and the non-player characters which temporarily disappeared from the game world. As in step S92 or step S96 in FIG. 16, the value to be added to the act number counter 43 may be varied for each non-player character in accordance with the state of the non-player character.

The act number counters 43 are updated in real time. By contrast, the boom values 44 are not updated in real time but at a predetermined timing (at the start of the game, the boom value update time (e.g., 6 a.m.), and when a scene change has occurred). Therefore, the influence of an act of the player character can be represented as gradually spreading to the non-player characters in the game world as a trend gradually spreads in the real world.

For updating each boom value 44 in accordance with the value of the act number counter 43, the boom correction coefficient corresponding to the boom is multiplied. Owing to this arrangement, the degree of influence exerted on the boom value 44 may be varied in accordance with whether the player has performed a relatively difficult act of, for example, digging up fossil or a relatively easy act of, for example, collecting seashells on the beach.

For updating each boom value 44 in accordance with the value of the act number counter 43, the NPC correction coefficient corresponding to the non-player character is multiplied. Owing to this arrangement, each non-player character can be provided with a personality; for example, the cat-like non-player character NPC2 shown in FIG. 4 is represented as being likely to get interested in fish. Thus, the player can feel close to the non-player characters.

In this embodiment, only one player character appears in the non-communication mode. Alternatively, a plurality of player characters may be selectively switched. This may be performed as follows, for example. First, a first player plays the game with a first player character, and terminates the game after storing the game data. Then, a second player resumes the game with a second player character, using the NPC data stored by the first player. In this way, when resuming the game some time later, the first player may find that an unexpected boom has been caused by the influence of the act of the second player character. The player obtains a fresh feeling each time he/she plays the game.

While the invention has been described in detail, the foregoing description is in all aspects illustrative and not restrictive. It is understood that numerous other modifications and variations can be devised without departing from the scope of the invention.

What is claimed is:

1. A computer-readable storage medium having stored thereon a game program for displaying, on a display device communicating with a computer executing the game program, a game world including a player character acting in accordance with operation information which is output from an input device to the computer by an input operation of a player and a plurality of non-player characters acting in a self-active manner, the game program causing the computer to function as:

player character control means for controlling an act of the player character in accordance with the operation information which is output from the input device;

act number counter update means for, when the player character performs each of a plurality of acts which are respectively associated with a plurality of act tendencies influencing an act of each non-player character performed in a self-active manner, updating a counter for the act tendency corresponding to the act of the player character among act number counters respectively provided for the act tendencies of each non-player character;

act tendency value update means for updating an act tendency value, obtained by enumerating a value for each act tendency of each non-player character, based on the value of the corresponding act number counter, the updating being performed at a predetermined timing without depending on the act of the player character;

non-player character motion control means for controlling a motion of each non-player character based on the act tendency corresponding to the act tendency value; and the display device displaying the game world including the player character and the plurality of non-player characters on the display device, wherein each of the act number counters is individually provided for a respective one of the plurality of non-player characters, and the act number counter update means individually updates each of the act number counters of each of the non-player characters in accordance with a state of existence of each non-player character in the game world.

2. A computer-readable storage medium according to claim 1, wherein the act number counter update means updates each act number counter of each non-player character with a different value depending on when the non-player character enters the game world.

3. A computer-readable storage medium according to claim 1, wherein the act number counter update means updates each act number counter of each non-player character with a different value in accordance with the position of the non-player character in the game world.

4. A computer-readable storage medium according to claim 1, wherein the act number counter update means updates each act number counter of each non-player character with a different value in accordance with whether or not the non-player character is displayed on a screen of the display device.

5. A computer-readable storage medium according to claim 1, wherein the act number counter update means updates each act number counter of each non-player character with a different value in accordance with the positional relationship between the player character and the non-player character.

6. A computer-readable storage medium according to claim 1, wherein when the value of any act number counter has reached a predetermined upper limit, the act number counter update means does not update the act number counter.

7. A computer-readable storage medium according to claim 1, wherein until a certain duration of time passes after each act tendency value of each non-player character is changed by the act tendency value update means, the act number counter update means does not update the corresponding act number counter of the non-player character.

8. A computer-readable storage medium according to claim 1, wherein:

the act number counter update means updates each act number counter each time the player character performs one of the plurality of acts respectively associated with the plurality of act tendencies; and the act tendency value update means updates each act tendency value at a predetermined timing, which is not each time the player character performs one of the plurality of acts respectively associated with the plurality of act tendencies.

9. A computer-readable storage medium according to claim 8, wherein the act tendency value update means updates each act tendency value when the player starts or resumes the game.

10. A computer-readable storage medium according to claim 8, wherein the act tendency value update means updates each act tendency value at a certain time daily.

11. A computer-readable storage medium according to claim 8, wherein the act tendency value update means updates each act tendency value when a scene change has occurred in a game image displayed on the display device.

12. A computer-readable storage medium according to claim 1, wherein the act tendency value update means updates each act tendency value using a value obtained by multiplying a value of the corresponding act number counter by a correction coefficient predetermined for each act tendency.

13. A computer-readable storage medium according to claim 1, wherein the act tendency value update means updates each act tendency value using a value obtained by multiplying a value of the corresponding act number counter by a correction coefficient predetermined for each non-player character.

14. A computer-readable storage medium according to claim 1, wherein when there is an act tendency value which has reached a predetermined upper limit after the act tendency value update means updates each act tendency value of each non-player character, the act tendency of the non-player character is changed into the act tendency corresponding to the act tendency value which has reached the upper limit and resets the act tendency value which has reached the upper limit.

15. A computer-readable storage medium according to claim 14, wherein when the act tendency value which has reached the upper limit is reset, the remaining act tendency values are updated to be reduced.

16. A game apparatus for displaying, on a display device, a game world including a player character acting in accordance with operation information which is output from an input device by an input operation of a player and a plurality of non-player characters acting in a self-active manner, the game apparatus including a computer communicating with the display device and the input device and executing a game program stored on computer-readable storage medium, the game apparatus comprising:

player character control means for controlling an act of the player character in accordance with the operation information which is output from the input device;

act number counter update means for, when the player character performs each of a plurality of acts which are respectively associated with a plurality of act tendencies influencing an act of each non-player character performed in a self-active manner, for updating an act number counter for the act tendency corresponding to the act of the player character among act number counters respectively provided for the act tendencies of each non-player character;

act tendency value update means for updating an act tendency value, obtained by enumerating a value of each act tendency of each non-player character, based on the value of the corresponding act number counter, the updating being performed at a predetermined timing without depending on the act of the player character;

non-player character motion control means for controlling a motion of each non-player character based on the act tendency corresponding to the act tendency value; and the display device displaying the game world including the player character and the plurality of non-player characters on the display device, wherein each act number counter is individually provided for a respective one of the plurality of non-player characters, and the act number counter update means individually updates each act number counter in accordance with a state of existence in the game world of the non-player character for which the act number counter is provided.

17. A computer-readable storage medium storing a game program for displaying, on a display device, a virtual game world including a player character acting in accordance with operation information received from an input device and by an input operation of a player and a plurality of non-player characters acting in a self-active manner, the game program causing the computer to perform the functions of:

controlling acts of the player character in accordance with output information received from the input device;

updating a value in an act number counter in the computer for each of a plurality of non-player characters, wherein the value indicates repeated occurrences of the player character performing an act associated with an act tendency of the plurality of non-player characters;

updating an act tendency value stored in the computer for each of the plurality of non-player characters, wherein the act tendency value represents an act tendency characteristic used by the computer to control actions of the corresponding non-player character in the virtual game world and the act tendency value is based on the value of the corresponding act number counter, wherein the act tendency value is updated periodically;

controlling movement in the virtual game world of each of the non-player characters based on an act tendency corresponding to the act tendency value; and displaying the game world including the player character and the plurality of non-player characters on the display device, wherein each act number counter is individually provided for a respective one of the plurality of non-player characters, and each act number counter is periodically updated in accordance with a state of existence in the game world of the non-player character for which the act number counter is provided.

* * * * *